Patented Apr. 28, 1931

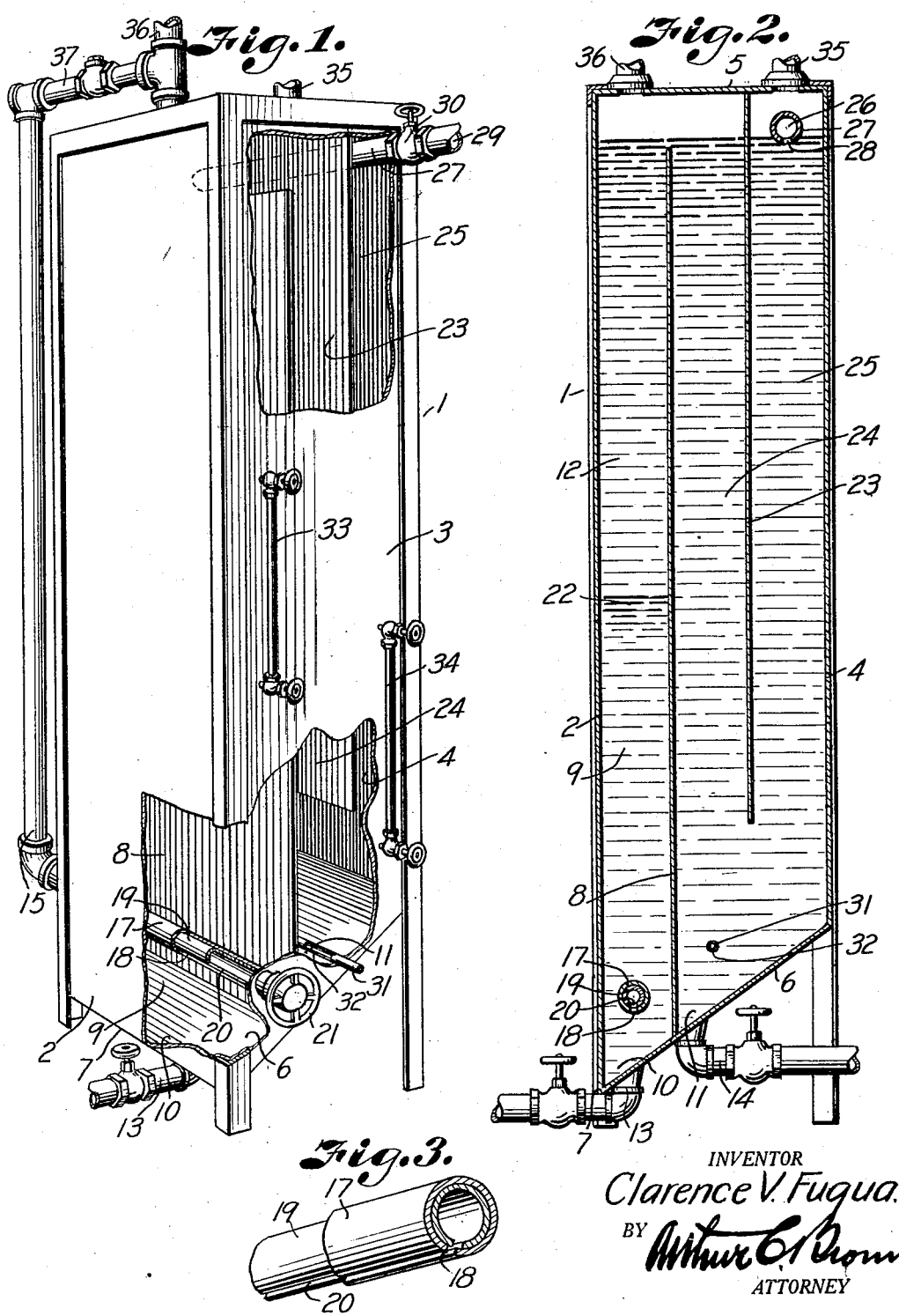

1,803,011

UNITED STATES PATENT OFFICE

CLARENCE V. FUQUA, OF KANSAS CITY, MISSOURI, ASSIGNOR TO THE CLEANERS EQUIPMENT CORPORATION, OF KANSAS CITY, MISSOURI, A CORPORATION OF MISSOURI

SAPONIFICATION TANK

Application filed July 5, 1927. Serial No. 203,555.

My invention relates to means for clarifying fluids and more particularly to such clarification means as are designated saponification cabinets.

My object is to provide a saponification cabinet having among others the following improved means: of directing the fluid into contact with the saponification element, of circulating the fluid, of detaining the waste, of withdrawing the waste, of agitating the fluid in process of cleansing, and of withdrawing the cleaned fluid from the cabinet. These and other objects I accomplish by providing a cabinet having vertically staggered baffle plates disposed in special manner, and means by which the fluid to be clarified, and the steam, may be admitted through slotted tube valves in sheet form and the fluid may be taken away in the same sheet form through a slotted tube outlet; the cabinet offered being adaptable to additional uses in the reclamation and purification of a fluid.

My improved means of clarifying a fluid is designed particularly for service in a so-called dry-cleaning plant, in which gasoline, naphtha or a similar fluid is employed for the washing of garments and other fabric items. The fluid extracts foul matter and dirt from the fabrics and carries a certain proportion of the same, together with soap and other compounds that may have been introduced for supplementing the action of the fluid and that may or may not have been substantially changed in nature. If the fluid that has served to clean one batch of garments is left in the washer and used to clean a second batch of garments, the soiled fluid, holding foul matter, will ineffectually clean such second batch and will transmit to such garments not only foul matter withdrawn from garments of the first batch, but also an undesirable and tenacious odor. If the fluid that has been used once is withdrawn from the washer and stored for a few minutes or over night in a tank, the used, uncleaned fluid retains much of the waste that it has extracted from garments; and its reuse is objectionable.

The industry has sought, therefore, means to clarify and purify the used fluid so that the fluid may be used more than once, and yet perform the desiredly efficient service in each successive employment as the cleansing agent. Methods and apparatus have been provided, therefore, including the redistilling of the fluid, the settling out of the heavier particles, the precipitation of matter by the use of chemicals, and many means of filtering including the washing of the fluid with water.

One of the more useful and important means of cleansing used fluid, and which is generally employed in the larger plants, is the saponification process. In this process, used fluid that still carries foulness is conducted into the lower part of a chamber that holds a loose mass of an alkali reagent. The fluid flows through the alkali, a reaction being the formation of a saponaceous product that forms a filter wherethrough the stream of fluid may be propelled. The saponification reaction and the filtering of the fluid through the saponaceous product of the reaction both contribute to the result of purification of the fluid.

Another incident in the usual process of clarification is the provision of a bleaching agent, deposited on the scum-filter referred to, through which the fluid passes, the bleaching material constituting an additional filtering factor.

It has been found, however, that the fluid after passing through a saponification process still holds a proportion of the foreign matter for the precipitation of which insufficient time had elapsed in the passage through the alkali, and which had not been emulsified because of the inefficient provision for bringing the greasy materials into contact with the alkali; or which, being not greasy, the alkali would not capture by means of emulsification. Various means have been devised for capturing and removing such waste matter and also for providing a continuous flow of fluid from the washers through the cleansing agencies and back to the washers for reuse.

In ordinary practice the gasoline is admitted into the clarification device through the round opening of a tube, the clarified fluid is similarly withdrawn, and fluid agents are admitted in round tube flow streams for agitation and other purposes. The admission of fluids by round tube flow means projects the fluid in moving mass having a relatively small transmission area, the said mass therefore tending to contact only small portions of the chemicals in its movement. Fluid agents introduced by round tube flow similarly tend to influence only the relatively small proportions of the substances which they are intended to contact. The effect of fluids introduced by round tube flow is sometimes assisted and improved by such positioning as will produce a centrifugal movement of the said fluids among the portions of the substances intended to be contacted. The effect may also be slightly modified by the projection of the fluid in spray form. But such improvements are of brief duration, since the centrifugal behavior of the introduced fluid either in single round tube flow or in multiple round tube flow as in a spray, sets up shortly a similar movement of the said substances, whereupon the introduced fluid and the substances, for example the incoming fluid and the chemical solution, tend to revolve in the same direction and simultaneously. The result is that particular particles of the incoming fluid continue in contact with particular particles of the chemical solution during the passage of the fluid through the solution.

The effect of round tube flow is especially deleterious with respect to the bleaching agent that is positioned on the scum-filter. The bleach material, constituting a mechanical bleach, normally floats near the surface of the solution produced by the admixture of grease and alkali, and is designed to capture mineral oils and other substances by capillary absorption. The relatively violent and rapid movement of a round tube flow of fluid carries alkali and the foul solution in a turbulent small stream into the bleach material, breaking a small path therethrough; a result being the absorption of alkali and foulness by the bleach, and the entangling of the bleach by the alkali, whereby the bleach is displaced or rendered unfit for its normal function.

As knowledge and experience have taught the industry, the tendency has been to provide in a continuously flowing system separate units to perform distinct duties in the filtering, rinsing and otherwise cleansing of the gasoline. Thus improvements have been developed in the various factors. The specific phase of gasoline reclamation and cleansing to which my invention relates is that of providing for the emulsifying of the greasy matter in the gasoline; and I have combined with improved provision for such purpose, the means of eliminating the non-greasy matter also. A further feature of my invention is the adaptability of the same to use as a water-rinsing agency and for other functions, when desired, as may occur in smaller plants where the amount of equipment must be kept at a minimum. I also disclose improved means of withdrawing the cleansed gasoline from the cabinet within which the cleansing takes place; and features for convenient and effective performance of incidental services in the treatment of the gasoline in said cabinet.

It is obvious that the incidental features may be made the chief features in a use of my device; the saponification substances being omitted for example and the cabinet being used as a water rinse cabinet.

An important feature of my method and device is the introduction and withdrawal of fluids by means of openings that produce a sheet-like flow. By this means the incoming fluid is projected upon the chemicals and through the solutions in such a way that a maximum of particles of the fluid contact, in passage, a maximum of particles of the chemicals; and the effective contacting of the particles occurs in a minimum of time. That is, the sheet flow of the fluid through the chemicals may be direct and continuous, whereby a larger volume of flow at higher speed, accompanied by a high degree of the desired effect of chemicals on fluid, is possible than in the case of a device using round tube flow.

My sheet flow feature also overcomes the objectionable effect on the bleach material referred to as resulting from round tube flow usage. The fluid, being projected in sheet form, moves in a smooth, even manner through the alkali and through the filter, contacting a maximum of surfaces of the bleach material, but producing no seething effect to disturb the integrity of the various masses of material or their relation to each other. A similar improved result occurs by reason of my introduction of supplementary agents, such as steam for agitation, through a sheet-forming means. An outlet that receives the fluid in sheet form spreads the suctional agitation over a relatively large area, and therefore minimizes such suctional agitation and its effect in drawing waste into the outlet flow. The outlet of such character, nevertheless, especially as adjusted in dimension to the dimension of the fluid inlet, provides for a maximum outflow proportionate to the inflow as increased by my device over the present practice.

I offer as representing my improvements, a method of reclaiming fluid and a device for employing such method comprising a rectangular cabinet equipped with improved features including an inlet valve supplying the fluid in sheet form to the alkali, baffles so positioned that they facilitate the treatment of the fluid and the elimination of extraneous matter and also produce chambers from which different kinds of such matter may be conveniently withdrawn, means for withdrawing cleansed fluid out of the circulating system, means for agitating the fluid under treatment, and means for withdrawing the fluid for use.

My device will now be more specifically described, reference being made to the drawings in which:

Fig. 1 is a perspective view of a cabinet equipped in accordance with my method, together with the service pipes, inlets and outlets; parts of the walls and of members being broken away for display of structure.

Fig. 2 is a vertical sectional view of the cabinet and its equipment shown in Fig. 1.

Fig. 3 is a detail perspective sectional view of the tubes comprising the inlet member.

Referring in detail to the drawings:

1 designates a cabinet, rectangular and preferably constructed of steel, its joints and seams welded, one wall thereof being for convenience designated as the rear wall 2, an adjacent side wall as 3, and the wall opposite the rear wall as the front wall 4. The structure so formed is closed above by the top plate 5, and below by a bottom plate 6 that extends upwardly and forwardly from the lower edge 7 of rear wall 2 to the lower edge of shortened front wall 4. A baffle 8 positioned transversely in the cabinet, as shown, is erected on the bottom plate 6, its upper edge spaced from the plate 5, its side edges contacting the side wall 3 and the side wall opposite thereto, the baffle spaced from the rear wall 2 and producing therewith and with the side walls the alkali chamber 9. The lower end 10 of the alkali chamber constitutes, through the angular incidence of bottom plate 6 with rear wall 2, a sump-like recess; and a similar sump-like recess is formed by the angular incidence of the baffle 8 with the bottom which will be referred to as the catch basin and is designated 11. The cabinet is assumed to contain a fluid, for example a cleansing fluid such as gasoline, designated as 12, the fluid being present in various conditions in different parts of the cabinet enclosure as will be described. A controlled outlet 13 is provided for the sump-like recess 10, through which outlet the substances in alkali chamber 9 and the sump-like recess 10 may be withdrawn; and a similar controlled outlet 14 is provided for the catch basin 11.

A pipe 15 served through means not shown by pumping from a storage tank or from the circulating system, enters the cabinet near the lower end thereof, its inlet into the tank being through an inlet slot valve 16 positioned transversely of the cabinet and in the sump-like recess 10 of alkali chamber 9; the valve, having a structure presently to be described, extending through the cabinet, and having a projection beyond the side wall 3. The inlet valve 16 comprises an outer tube 17 having a longitudinal slot 18; and an inner tube 19 having a longitudinal slot 20, the inner tube 19 being rotatably mounted within the outer tube 17. A valve grip 21 is provided, positioned exteriorly to the cabinet and secured to the projecting end of the inner tube 19. Rotation of the valve grip 21 causes the inner tube to rotate, and to bring the slot 20 of the inner tube into and out of coincidence, in successively varying degrees, with the slot 18 of outer tube 17. The gasoline propelled through the pipe 15 may be restrained from issuance into the chamber 9 by such actuation of the valve 16 as will prevent incidence of the slots 18 and 20; and gasoline may be admitted to the chamber 9 in such extent as desired consonant with the sizes of the slot by such manipulation of the valve 16 as will produce any degree of incidence of the slots 18 and 20 from slight to complete. An important function of the valve as described is to provide a supply of gasoline issuing therefrom in a wide stream constituting and in the art referred to as a sheet. The desirability of producing such form of stream will be disclosed presently.

In the alkali chamber 9 is deposited a quantity of a material desired for treatment by the fluid; in the particular case being described, such material being an emulsifying agent such as an alkali, the extent in a particular case of the deposit of the alkali being indicated by the heavily dotted lines designated by 22, the upper surface of said deposit constituting a filter screen formed by the reaction of the greasy substances in the uncleansed gasoline with the emulsifying material. The gasoline rises in the chamber 9, through the alkali deposit, and through the filter surface, to the top of the baffle 8, and flows over the baffle thus by gravity, except as otherwise influenced in a manner later to be detailed. A second baffle 23 is provided, extending downwardly from the top plate 5 of the cabinet, positioned transversely of the cabinet parallel with baffle 8, spaced from baffle 8 and from front wall 4, and contacting the side walls of the cabinet, its lower edge projecting into the catch basin 11 above referred to. Baffle 23 forms with the baffle 8 and the side walls of the cabinet, an intermediate chamber 24; the gasoline being conducted, as it overflows baffle 8, downwardly by the walls of said chamber. The baffle 23 forms with the sides and the front wall 4 of the cabinet, a clean fluid chamber 25.

The gasoline, gravitating downwardly in chamber 24, fills the catch basin 11 and passing upwardly, rises in chamber 25 to a level condition with reference to the gasoline volume in chamber 24. An outlet 26 is provided, positioned at an altitude adjacent the altitude of the upper edge of baffle 8, through which the gasoline may gravitationally find egress from the cabinet. The adjustment of positioning of said outlet 26 is such that the predetermined altitude of gasoline volume i in the cabinet at which the gasoline flows over the upper edge of baffle 8, constitutes the level for the functioning of the outlet.

The outlet 26 will be particularly described since it constitutes an important feature of my device. The outlet 26 comprises a tube 27 of diameter substantially equal to that of outer tube 17 of valve 16, having a longitudinal opening 28, the opening being directed vertically downward; and the tube being longitudinally partly immersed in the gasoline, at the latter's outflow altitude, in such a manner that the surface of the gasoline forms an arc across the inner circular outline of the tube. The gasoline therefore enters the tube by way of an elongated opening. Said elongated opening 28 of the outlet tube 27 is equal in dimension to the slots 18 and 20 of tubes 17 and 19 of the inlet valve 16, whereby outlet capacity is provided equal to the maximum inlet capacity of said valve 16; a factor of pressure from the pump supplying gasoline being involved that is provided for in the continuous flow arrangement whereby a suction influence is exercised on the outlet 26 to draw the fluid from the cabinet through outlet pipe 29, provided with a stop valve 30, back into the tank from which the gasoline is pumped to the cabinet.

A tube 31, having a longitudinal slot 32, is positioned in the catch basin adjacent the bottom plate and the baffle 8 and parallel with the valve 16 and outlet tube 27; for the purpose of admitting steam, or other agency for treatment of the gasoline and other materials that may be in the catch basin, or may be passing from intermediate chamber 24 to clean fluid chamber 25, steam being admitted to the tube by ordinary valve means not shown.

Gauges are also provided through which the condition of the fluid in substances in the cabinet may be indicated, a gauge glass 33 disclosing the conditions in the alkali chamber and a gauge glass 34 serving the catch basin and clean fluid chamber.

Suitable vents are provided, such as the vent 35 in the top of the cabinet to provide the safety factor for chambers 9 and 24, and vent 36 serving the clean fluid chamber 25. An anti-siphon valve is provided for the gasoline supply pipe 15, and as shown is situated in a cross arm pipe 37 for the supply pipe to the vertical pipe constituting a vent 35 leading to a suitable outside opening.

While I describe my invention as adapted to use in a cleaning plant, the device may be used in other structures and for related purposes, namely, for processes in connection with the manufacture of fluids of relatively high specific gravity, and for other treatments of fluids.

Provision of such a device as I present is the more needed in the industries affected, in view of the tendency to offer fluids for cleansing purposes of lower specific gravity than gasoline and similar substances heretofore not widely used. Whereas the facilities and methods heretofore employed for clarifying of fluids have been measurably satisfactory, such facilities and methods are proportionately less efficient as they are applied to the handling of the new substances. My device serves efficiently in the handling of such new substances; producing in the case of these, as in the case of gasoline, for example, conditions under which less storage need be arranged; that is, a plant requiring 10,000 gallons a day, that heretofore has required for such volume a storage capacity of approximately 10,000 gallons, may by the use of my device require a total supply of approximately 5,000 gallons of fluid.

What I claim and desire to secure by Letters Patent is:

1. Apparatus of the character described including a receptacle having a plurality of vertical baffles attached respectively to the top and bottom of said receptacle forming a tortuous passageway including inlet and outlet sections, a slotted valve in the lower portion of the inlet section for delivering dirty fluid to said inlet section, a slotted pipe in the upper portion of the outlet section for outlet of clean fluid from the receptacle, and a slotted valve at an intermediate position in the passageway for delivering a treating fluid into the fluid flowing through the passageway.

2. In an apparatus of the character described including a tank, and fluid inlet and outlet lines, a valve connected with the inlet line comprising a pipe slotted longitudinally extending transversely into the tank, a slotted pipe comprising a sleeve surrounding the first named pipe, and means for rotating one of said pipes for varying the effective areas of the slots.

3. Apparatus of the character described including a tank, a fluid flow line including a pipe slotted longitudinally extending transversely into the tank, and a sleeve surrounding said pipe having a slot registrable with the slot thereof for adjusting the size of the stream of fluid flowing through said pipe.

In testimony whereof I affix my signature.

CLARENCE V. FUQUA.